INVENTOR.
Emery I. Valyi
BY
ATTORNEY.

Nov. 24, 1953  E. I. VALYI  2,659,945
MOLD FORMING MACHINE
Filed May 15, 1951  9 Sheets-Sheet 5

INVENTOR.
Emery I. Valyi
BY
Atty.

Nov. 24, 1953 E. I. VALYI 2,659,945
MOLD FORMING MACHINE
Filed May 15, 1951 9 Sheets-Sheet 6
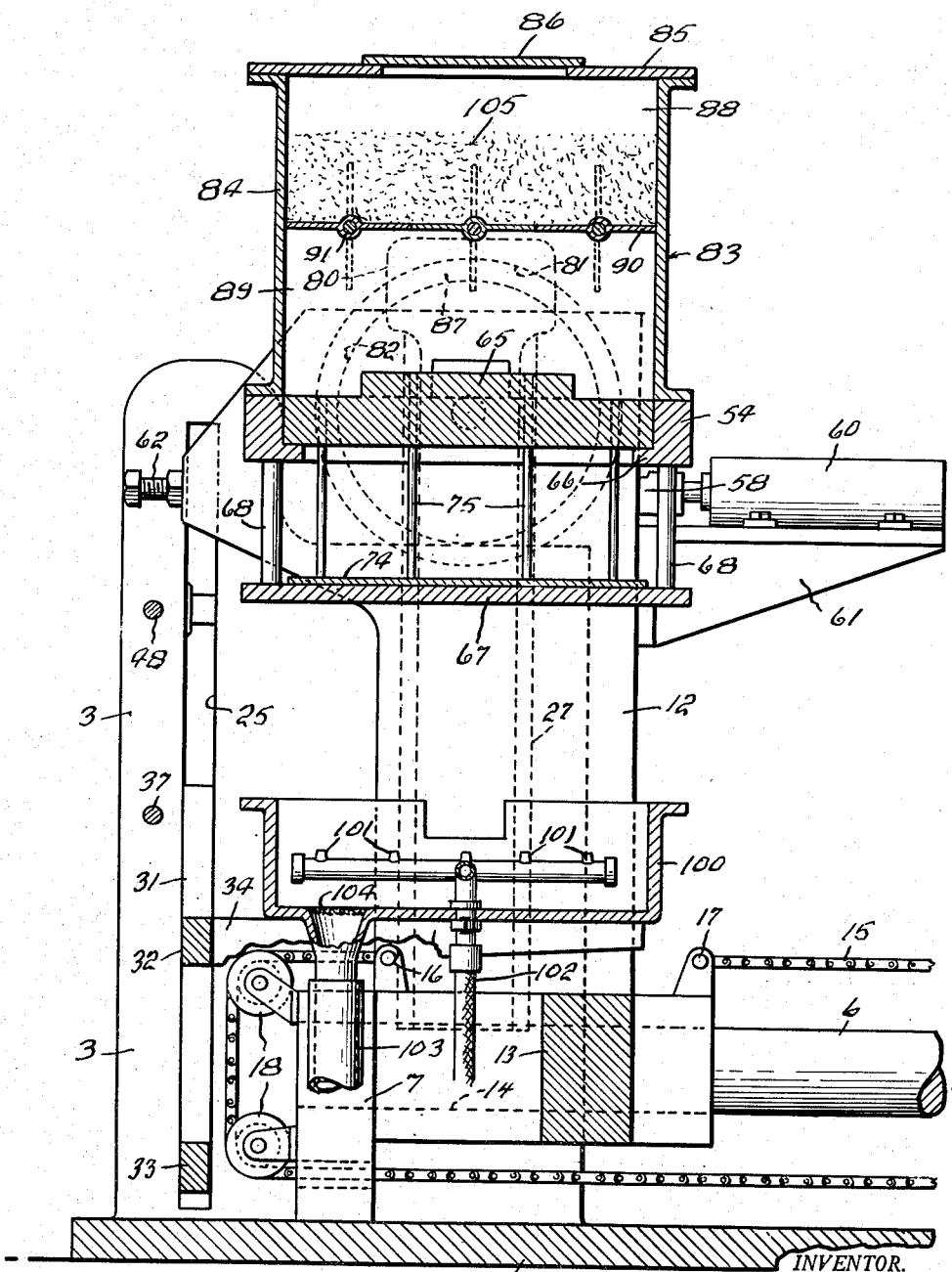
Fig. 6
INVENTOR.
Emery I. Valyi
BY
ATTORNEY.

Nov. 24, 1953 — E. I. VALYI — 2,659,945
MOLD FORMING MACHINE
Filed May 15, 1951 — 9 Sheets-Sheet 7

INVENTOR.
Emery I. Valyi
BY
Atty.

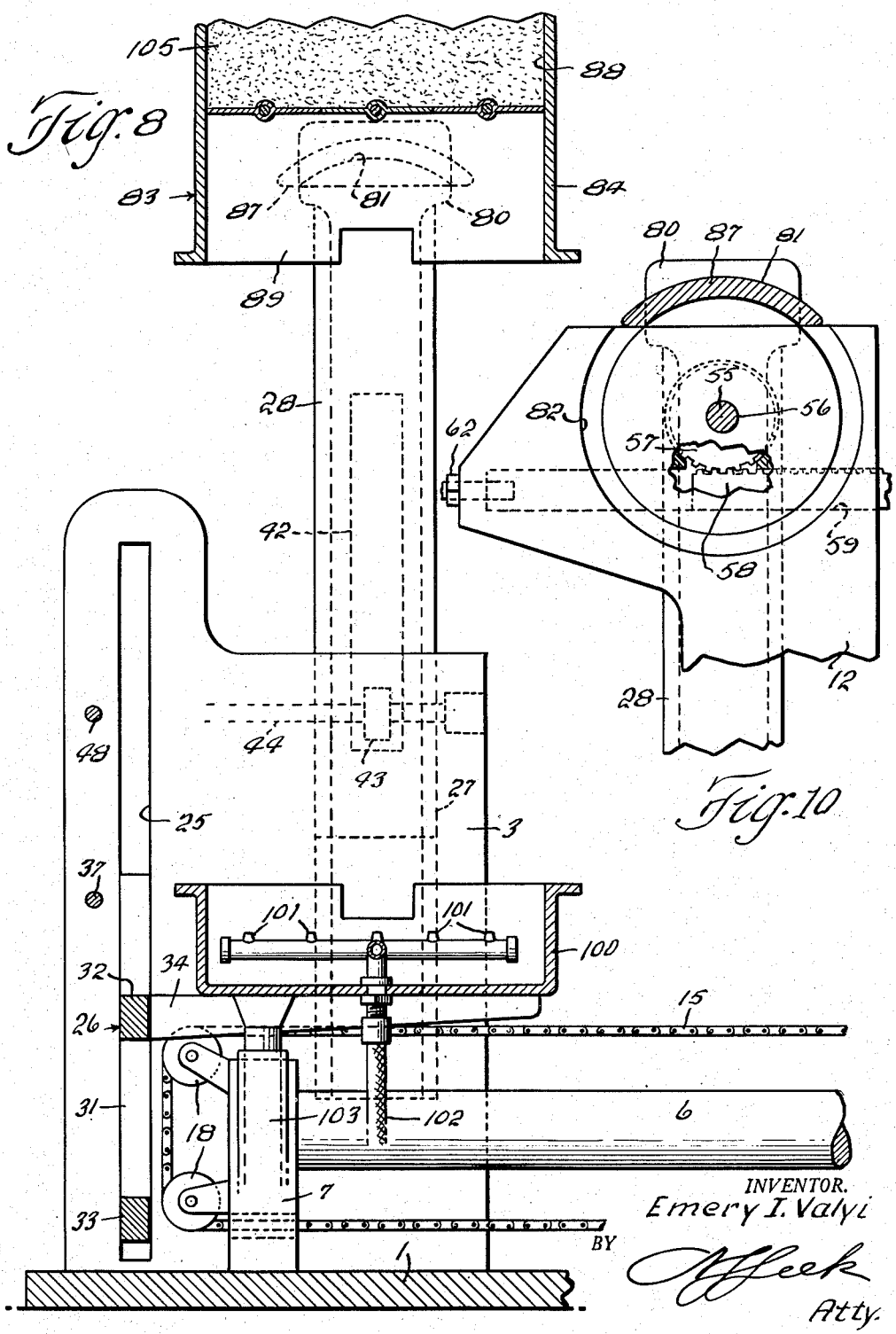

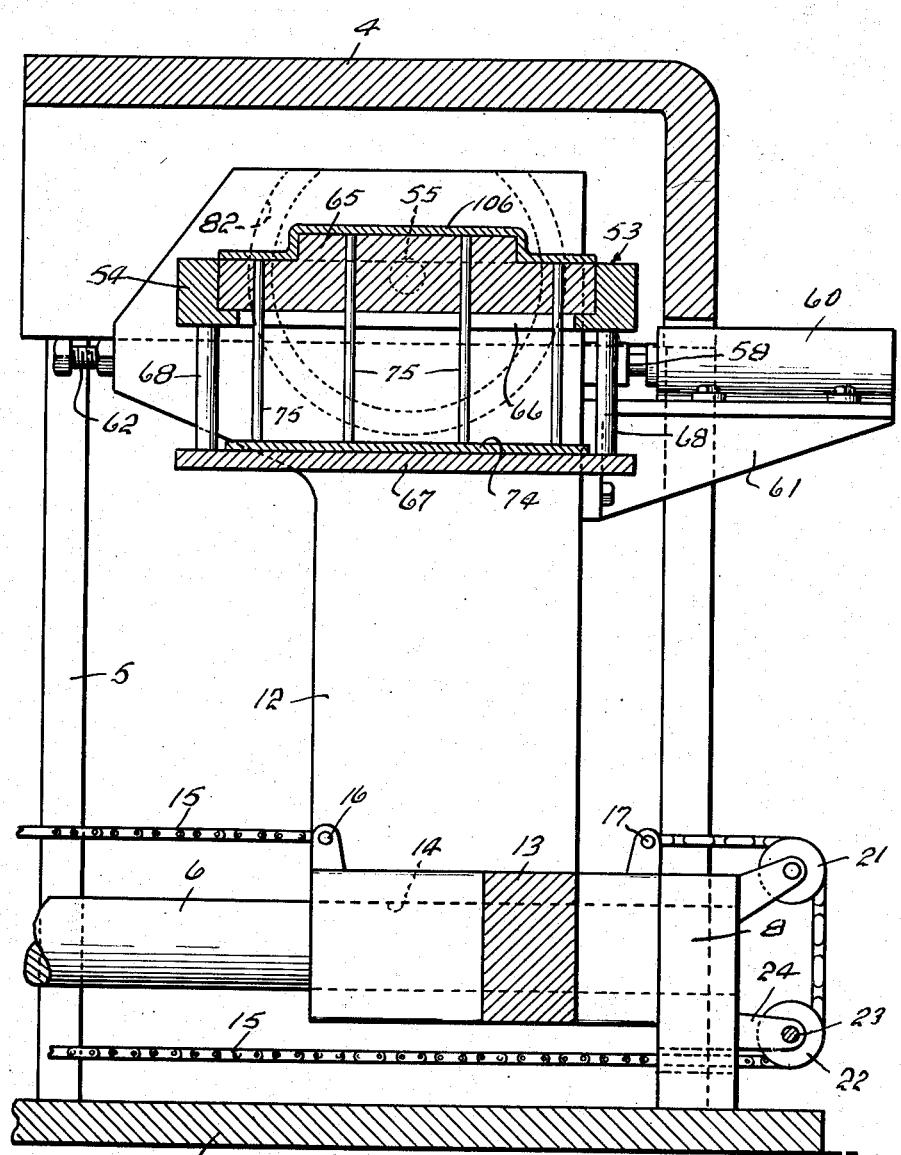

Patented Nov. 24, 1953

2,659,945

UNITED STATES PATENT OFFICE 2,659,945

MOLD FORMING MACHINE

Emery I. Valyi, Bronx, N. Y., assignor to Shellmold & Machine Co., Inc., New York, N. Y., a corporation of New York Application May 15, 1951, Serial No. 226,460

16 Claims. (Cl. 22—20)

This invention relates to an apparatus for producing foundry molds in shell form from a molding mixture comprising a refractory and a bonding agent.

The machine provides means for processing a permanent pattern in a plurality of steps for pretreating the pattern, forming the mold shell thereon, curing the shell and stripping the cured shell from the pattern.

More specifically the machine includes a pattern carrier with ejector pins, mounted to rotate about a horizontal axis for inverting and restoring the carrier as required, a hopper carrying the molding mixture, a container for a mold release liquid, and a heating oven. Mechanism is provided for bringing the pattern carrier and hopper into juxtaposition for applying a layer of the molding mixture to the patterns, inverting the pattern carrier and hopper as a unit to dump the excess mixture back into the hopper after the mold shell has been formed, bringing the carrier and oven into cooperating position for curing the shell, actuating the ejector pins to strip the cured shell from the pattern, and bringing the carrier and container into juxtaposition for applying a mold release liquid to the pattern prior to the next mold-forming sequence.

In the embodiment shown the carrier is mounted on a carriage to shift between a forming station and the oven. The hopper is disposed at the forming station to be raised or lowered into or out of contact with the carrier and to rotate with the carrier. The container is mounted below the carrier at the forming station to be raised or lowered as required, and the ejector pins are mounted on an ejector plate to be engaged by the hopper or by the container, according to whether the carrier is upright or inverted for stripping the mold shell from the pattern.

The sand hopper is shown as comprising a rectangular casing which is open at the lower end thereof and is adapted to be moved into and out of engagement with the pattern carrier around the periphery of the pattern. A set of louvers are mounted in the hopper between the upper and lower ends thereof and divide the hopper into two compartments. The louvers are opened and closed by suitable mechanism.

The container comprises a drain tank in which are mounted a plurality of spray nozzles. The drain tank is mounted to be raised and lowered and drains into a sump tank from which the release liquid is pumped under high pressure to the spray nozzles.

In operation the molding mixture is placed in the upper compartment above the louvers in the sand hopper. The hopper is then lowered into engagement with the top of the pattern carrier around the periphery of the pattern. The louvers are then opened to allow the molding mixture to drop down into the lower compartment upon the preheated pattern. After the mixture has bonded into a thin layer over the pattern, the pattern carrier and hopper are inverted by rotating them in unison through 180°. As the carrier and hopper are inverted the unbonded molding mixture falls back into the upper compartment (now the bottom compartment), leaving the thin bonded shell on the pattern. The louvers are then closed and the hopper and holder are restored to upright position, after which the hopper is raised from the pattern carrier. The carriage and pattern carrier with the partially cured shell on the pattern, are then shifted into the curing oven. After the shell is cured into a hard, rigid, strong condition, the carriage and parts carried thereby are returned to their original position.

The drain tank is then raised to engage and elevate the ejector plate which causes the ejector pins to strip the cured shell mold upwardly from the pattern after which the shell can be removed from the machine. If it is desired to strip the shell downwardly from the pattern, the pattern holder is inverted after its return from the curing oven and the hopper is moved downwardly to engage and depress the ejector plate.

After the shell has been stripped from the pattern, the pattern carrier with the pattern in upright position is returned to the curing oven for preheating of the pattern. After the pattern has been heated to the desired temperature the carrier and pattern are returned to their original position and inverted. The drain tank is then raised into engagement with the pattern carrier around the periphery of the pattern and the pump actuated to force the release liquid or parting solution through the spray nozzles in the drain tank to thoroughly spray the parting solution over the face of the pattern. The excess parting solution is filtered and drains back into the sump tank. The drain tank is then lowered and the carrier and pattern returned to upright position. The operation just described is then repeated for each shell mold.

When using metal patterns the refractory bonding agent mixture may comprise silica, aluminia or zirconia sands or flours for the refractory, and phenol; melamine or urea formaldehyde resins or other organic or inorganic bonding agents. With this mixture the pattern may be pre-heated to a temperature of from 350° F. to 600° F. The pattern may be contacted with the molding mixture to a depth of several inches for from five to twenty seconds during which time the heated pattern causes the mixture contacting the pattern to bond and solidify into a layer. A partly cured shell having a uniform thickness between one-eighth and one-quarter inch is thus formed over the pattern. The thickness of the shell depends on the time of contact and the temperature of the pattern. The curing oven may have a temperature between 500° F. and 900° F. The pattern and shell are subjected to curing temperatures until the shell is cured into a hard, rigid and strong condition.

The principal object of the invention is to provide an improved single station machine for producing shell molds from a molding mixture of the character described.

Another object of the invention is to produce a machine of this type which is of simple construction, is efficient in operation, and is relatively inexpensive to manufacture.

Other and more limited objects of the invention will be apparent from the following specification and the accompanying drawings forming a part thereof wherein:

Fig. 6 is a view similar to Fig. 5 showing the sand hopper down in engagement with the pattern holder preparatory to opening the louvers to drop the molding mixture down upon the pattern;

Fig. 8 is a central longitudinal section through the machine, taken after the carriage, pattern holder, pattern and partially cured shell thereon have been transferred to the curing oven;

Fig. 9 is a central longitudinal section through the curing oven and the carriage, pattern holder, pattern and shell therein;

Fig. 10 is a detail vertical section taken on the line 10—10 of Fig. 2, and

Figure 1:
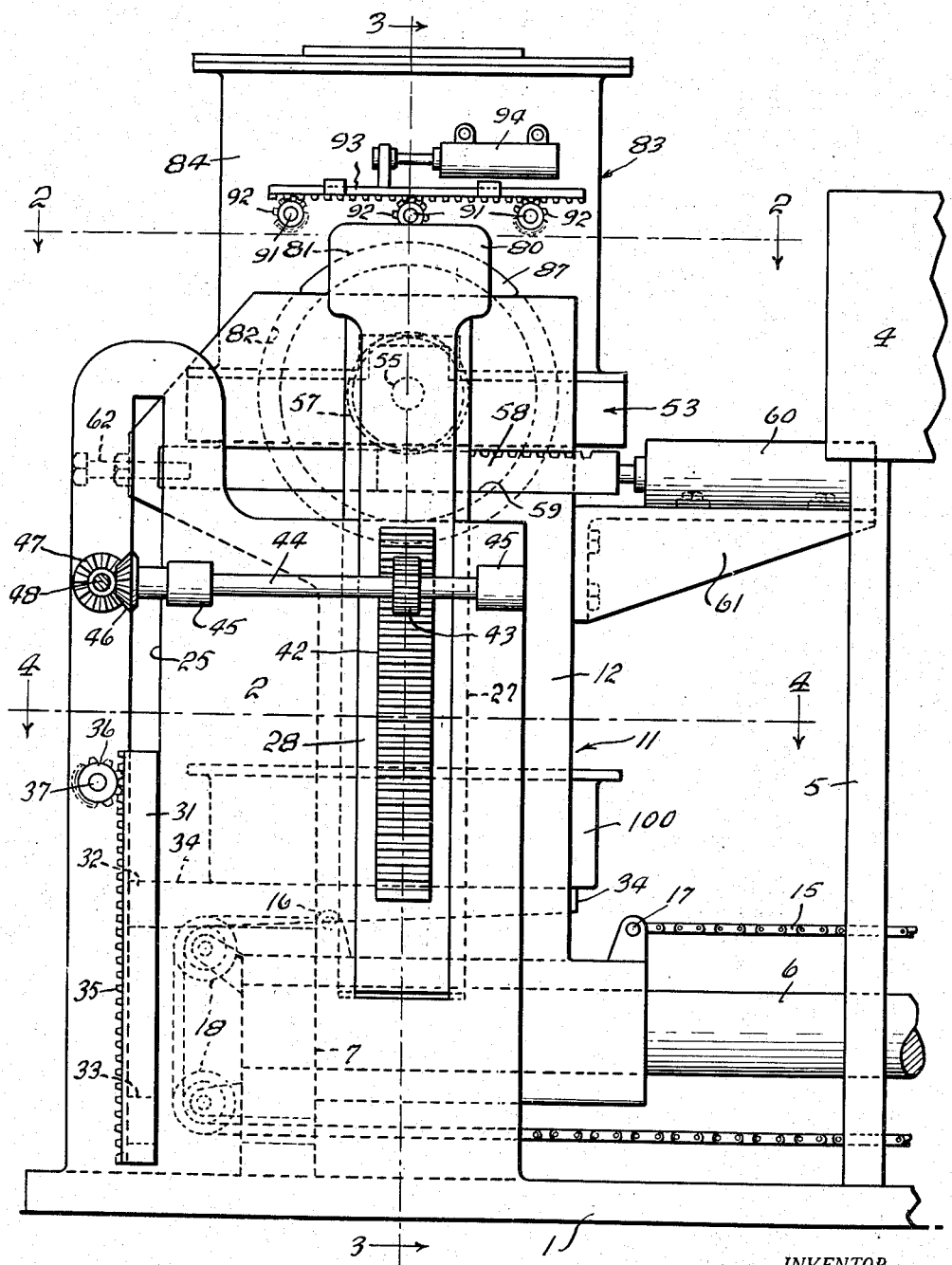
Fig. 1 is a side elevation of an apparatus for producing shell molds, which is constructed according to my invention.
Figure 2:
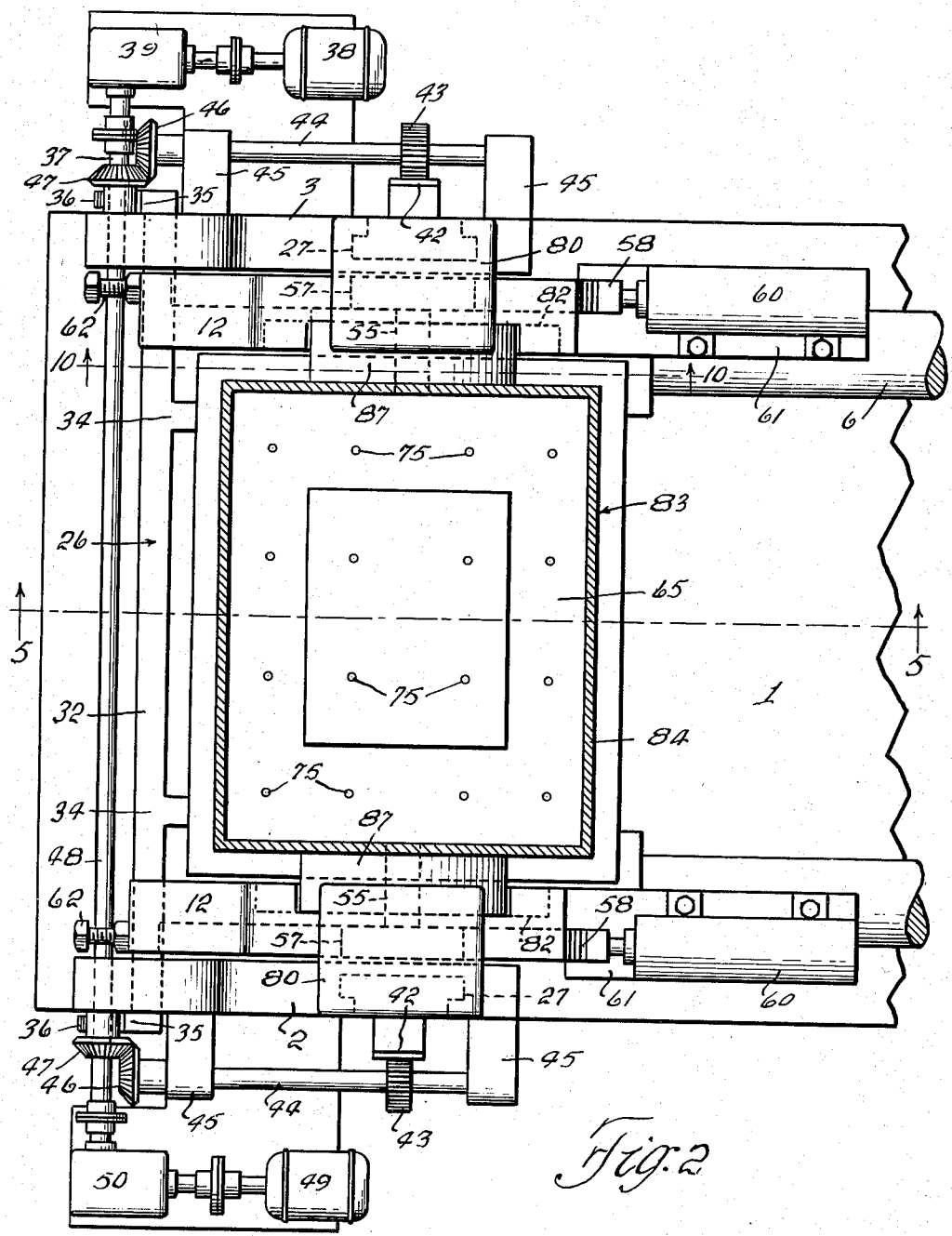
Fig. 2 is a plan view, partially in section, the plane of the section being indicated by the line 2—2 of Fig. 1.

Referring now to the drawings by reference characters, the numeral 1 indicates a flat rectangular base having spaced parallel similar side frames 2 and 3 extending upwardly from each side of the forward section thereof. A curing oven 4 is supported by posts 5 over the rear section of the base 1. A pair of spaced parallel guide rods 6 extend substantially the full length of the base 1 along the sides thereof. The forward ends of the guide rods 6 are mounted in blocks 7 extending upwardly from the base 1 between the side frames 2 and 3, and the rear ends of the guide rods 6 are mounted in blocks 8 extending upwardly from the base 1 under the rear end of the oven 4.

A carriage, generally indicated by the numeral 11, is slidably mounted upon the guide rods 6 for back and forth movement between the position shown in Figs. 1 to 7, inclusive, and the position shown in Fig. 9. The carriage 11 comprises two spaced vertical parallel similar sides 12 which are connected together at the lower ends thereof by a transverse beam 13 formed integral therewith. The lower ends of the sides 12 are each provided with a bore 14 through which a guide rod 6 extends. The carriage 11 is moved back and forth upon the guide rods 6 by a pair of similarly mounted chains 15. Each of the chains 15 has one end thereof connected to the forward end of a side 12 as indicated at 16, and the other end thereof connected to the rear end of a side 12 as indicated at 17; and each chain 15 passes around idler sprockets 18 mounted upon the blocks 7, an idler sprocket 21 mounted upon the blocks 8, and a driven sprocket 22 secured to a transverse shaft 23 rotatably supported by brackets 24 which are secured to the blocks 8 below the idler sprockets 21. The shaft 23 is adapted to be driven in either direction by any suitable means (not shown) to shift the carriage 11 as desired upon the guide rods 6.

The side frames 2 and 3 are provided with opposed vertical transverse slots 25, adjacent the forward ends thereof, in which a cantilever frame, generally indicated by the numeral 26, is mounted for up and down movement. The side frames 2 and 3 are also provided with vertical T slots 27, formed in the outer faces thereof rearwardly of the slots 25, in which a pair of similar posts 28 are mounted for up and down movement.

The cantilever frame 26 comprises two spaced uprights 31, which are connected together by the transverse bars 32 and 33, and a pair of spaced parallel rearwardly extending horizontal arms 34 which are formed integral with the upper transverse bar 32. The uprights 31 are slidably mounted in the slots 25 and each upright 31 has a rack 35 secured thereto adjacent the outer faces of the side frames 2 and 3. The racks 35 mesh with pinion gears 36 which are keyed to a transverse shaft 37 rotatably supported by the side frames 2 and 3. The shaft 37 is driven in either direction by a reversible motor 38 through a suitable speed reducer 39. The rotation of the shaft 37 in one direction or the other will move the cantilever frame 26 up or down in the slots 25.

Each of the posts 28 has a rack 42 secured to the outer face thereof which meshes with a gear 43 keyed to a shaft 44 which is rotatably supported by brackets 45 extending outwardly from the side frames 2 and 3. The forward ends of the shafts 44 have bevel gears 46 keyed thereon which mesh with bevel gears 47 keyed to a transverse shaft 48 which is rotatably supported by the side frames 2 and 3 directly above the shaft 37. The shaft 48 is driven in either direction by a reversible motor 49 through a suitable speed reducer 50. The rotation of the shaft 48 in one direction or the other will move the posts 28 up or down in unison in the T slots 27.

A pattern carrier or pattern holder, generally indicated by the numeral 53, which is rotatably mounted between the upper ends of the sides 12 of the carriage 11, comprises a rectangular frame 54 to which is secured a pair of oppositely extending axially aligned stub shafts 55. The stub shafts 55 are rotatably mounted in bearing apertures 56 in the carriage sides 12, and each shaft 55 has a pinion gear 57 keyed to the outer end thereof. Each of the gears 57 meshes with a rack 58 which is slidably mounted in a guide slot 59 in each of the sides 12 below the gears 57. The racks 58 are reciprocated by air actuated cylinder and piston assemblies 60 which are mounted upon brackets 61 secured to the rearward edges of the sides 12. The forward movement of the racks 58 is limited by adjustable stops 62. The reciprocation of the racks 58 in unison between their forward and rearward positions will rotate the pattern holder 53 back and forth through 180° between upright and inverted positions.

A metal pattern 65 is removably secured by any suitable means in the pattern holder 53 and rests upon an inturned flange 66 around the lower edge of the frame 54.

Figure 5:
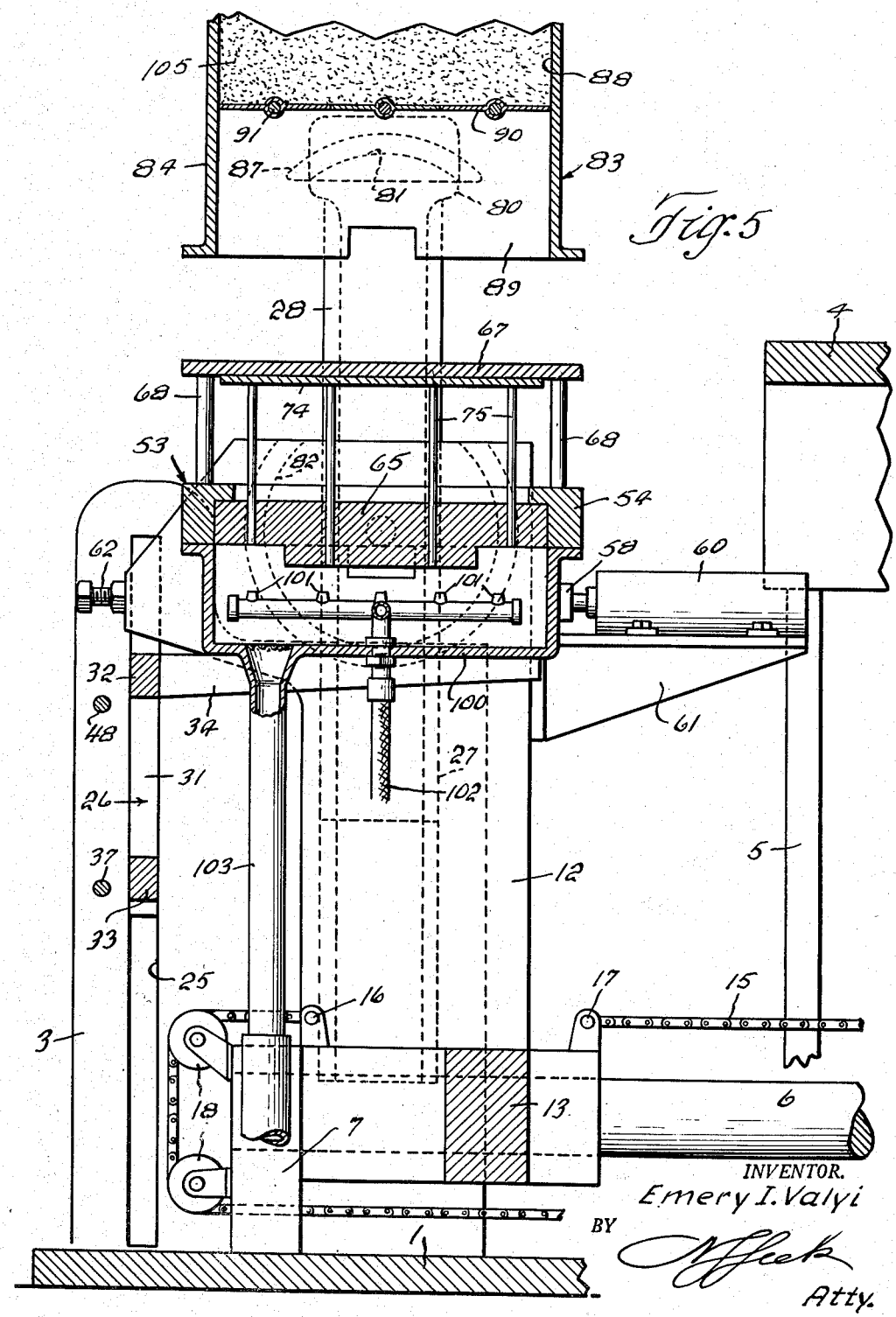
Fig. 5 is a central longitudinal vertical section taken on the line 5—5 of Fig. 1, showing the pattern holder in inverted position with the drain tank raised into engagement therewith preparatory to spraying the face of the pattern with parting solution.
Figure 7:
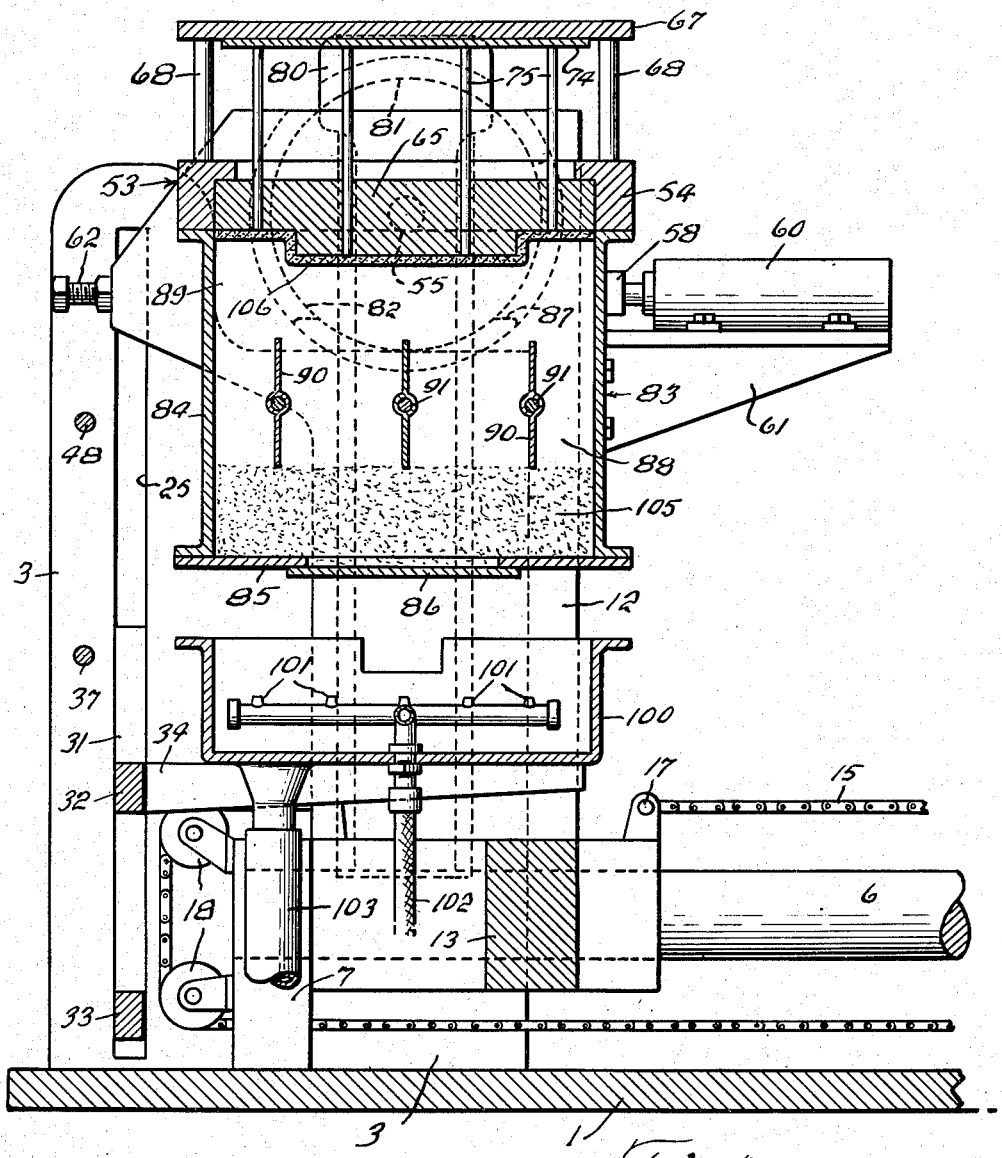
Fig. 7 is a view similar to Figs. 5 and 6 showing the pattern holder and sand hopper inverted in order to return the unbonded molding mixture back to the upper compartment of the hopper.
Figure 11:
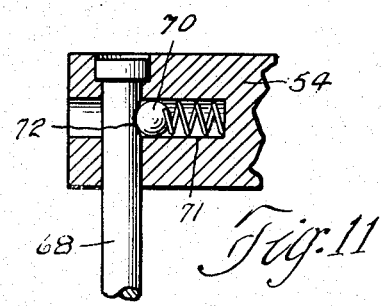
Fig. 11 is a fragmentary detail section.

An ejector plate 67 is secured to the lower ends of rods 68 which are slidably mounted in the pattern holder frame 54 and extend downwardly from each corner thereof. The rods 68 are yieldingly held in their normal position when the pattern holder is inverted, as shown in Figs. 5 and 7, by spring pressed balls 70 which are mounted in bores 71 in the pattern holder frame 54 and engage tapered notches 72 in the rods 68 (Fig. 11). A clamping plate 74 carrying a plurality of stripping pins 75 is removably secured to the ejector plate 67. The stripping pins 75 extend upwardly through bores in the pattern 65 and terminate flush with the face of the pattern.

Figure 3:
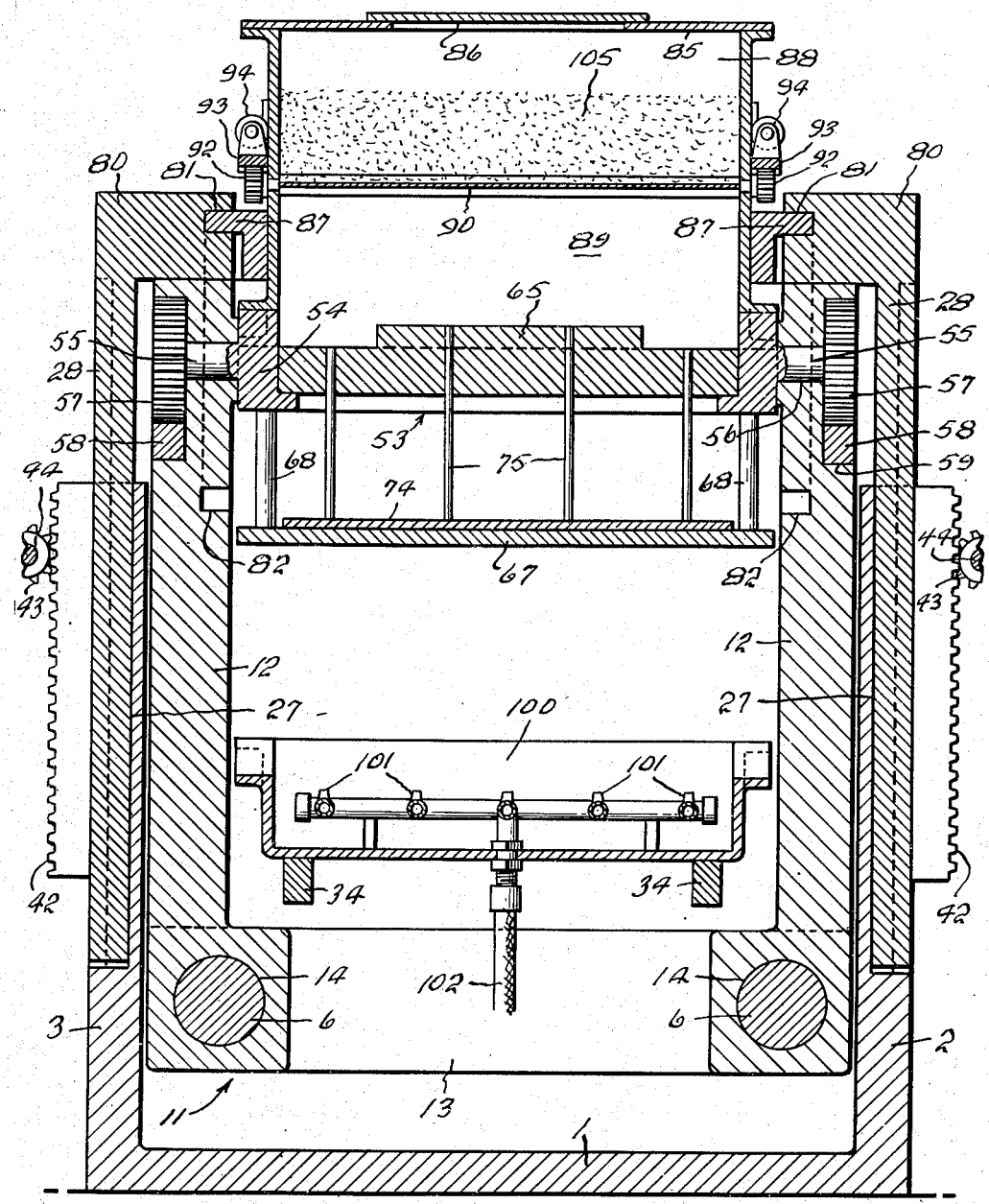
Fig. 3 is a transverse vertical section taken on the line 3—3 of Fig. 1.
Figure 4:
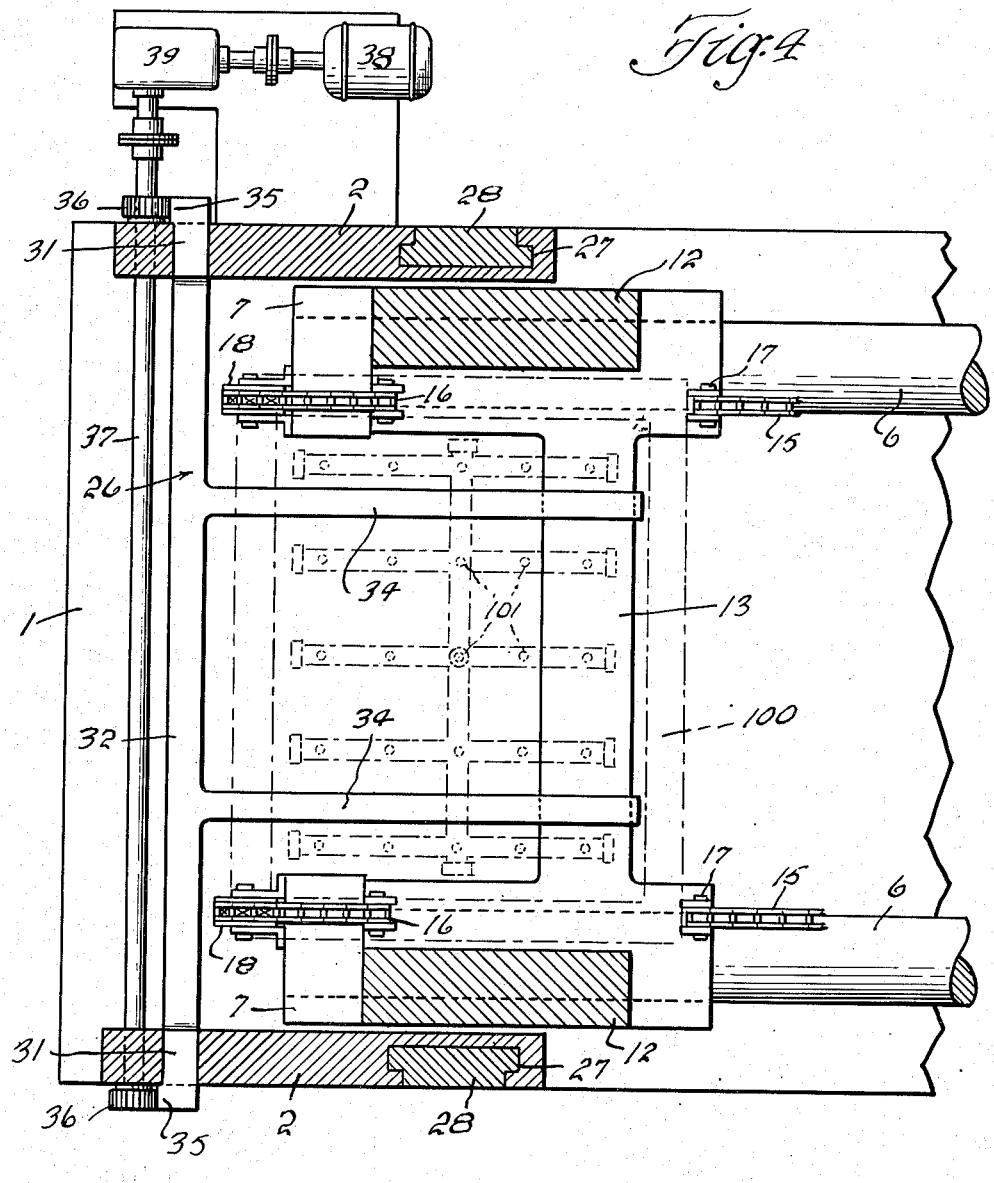
Fig. 4 is a horizontal section taken on the line 4—4 of Fig. 1, the drain tank assembly being omitted for the purpose of illustration.

The upper ends of the posts 28 are enlarged, as indicated at 80, and extend inwardly over the upper ends of the sides 12 of the carriage 11. The opposed inner faces of the heads 80 of the posts 28 are disposed in the planes of the opposed inner surfaces of the carriage sides 12. The inner faces of the heads 80 have arcuate slots 81 formed therein which register with arcuate slots 82 in the inner surfaces of the carriage sides 12 when the posts 28 are in their lowermost position, as shown in Figs. 1, 3 and 10. The slots 81 and 82 when in register form a complete circle, the center of which is in the axis of the stub shaft 55.

A hopper 83 is mounted between the upper ends of the posts 28 for up and down movement therewith. The hopper 83 comprises a rectangular frame 84 the lower end of which is open and the upper end of which is closed by a plate 85 having a door 86 therein. The front and back walls of the frame 84 have arcuate segments 87 secured thereto which extend into the arcuate slots 81 in the heads 80 of the posts 28. The radii of curvature of the segments 87 are the same as the radii of the slots 81 and 82 so that the segments 87 may be rotated about the axis of the stub shafts 55 to move the segments out of the slots 81 in the post heads 80 and into the slots 82 in the carriage sides 12. The hopper 83 is normally disposed over the pattern holder 53 and is adapted to be brought down into engagement with the upper edge of the pattern holder frame 54 with the inner walls of the hopper registering with the inner walls of the frame 54. When the hopper 83 is in engagement with the pattern holder 53, it is adapted to be inverted in unison with the pattern holder. During inversion the segments 87 leave the slots 81 in the post heads 80 and enter the slots 82 in the sides 12 of the carriage 11 which maintains the hopper against the pattern holder around the pattern. The hopper 83 is divided into upper and lower compartments 88 and 89 by a set of louvers 90 which are secured to shafts 91 rotatably supported by and between the front and back walls of the hopper. The ends of the shafts 91 have gears 92 secured thereto which mesh with racks 93 slidably mounted on the front and back walls of the hopper. The racks 93 are adapted to be reciprocated by air actuated cylinder and piston assemblies 94 which are secured to the hopper walls above the racks 93. The reciprocation of the rack 93 will move the louvers 90 back and forth between their open and closed positions, as shown in Figs. 6 and 7.

The pattern treating mechanism by which the pattern is cleaned and a parting solution applied thereto comprises a drain tank 100 open at the upper end thereof which is mounted upon and removably secured to the arms 34 of the cantilever frame 26. A plurality of spray nozzles 101 are mounted in the tank 100. The parting solution is pumped under high pressure from a sump tank (not shown) to the spray nozzles 101 through a flexible hose 102. Excess solution drains back to the sump tank through a conduit 103 which is telescopically connected to the drain tank 100. A screen 104 is provided to keep any dirt or other foreign matter from draining into the sump tank with the excess parting solution.

In operation the molding mixture 105 is placed in the upper compartment 88 of the hopper 83. The hopper is then brought down into engagement with the upper edge of the pattern holder frame 54, as shown in Figs. 1, 3 and 6, with the hopper surrounding the pattern 65 which has been preheated and treated, as will be presently described. The louvers 90 are then opened, as shown in dotted lines in Fig. 6 and in full lines in Fig. 7. Upon the opening of the louvers 90 the molding mixture falls down into the lower compartment 89 of the hopper over the preheated pattern 65. After the mixture has been in contact with the heated pattern for a predetermined length of time the pattern holder and hopper are rotated in unison through 180° from the position shown in Fig. 6 to the position shown in Fig. 7. During the time the mixture is over the pattern 65 the contacting portion thereof bonds and solidifies into a partially cured shell 106 over the face of the pattern. The thickness of the shell is dependent upon the temperature of the pattern and the length of time the mixture is maintained in contact therewith. As the pattern carrier and hopper are being inverted from the position shown in Fig. 6 to the position shown in Fig. 7, the unbonded portion of the mixture falls back into compartment 88, leaving the shell 106 adhering to the face of the pattern. After the carrier and hopper have been inverted the louvers 90 are immediately closed and the carrier and hopper returned to the upright position shown in Fig. 6 with the mixture 105 in the compartment 88 above the louvers 90.

The hopper is then raised up from the pattern holder 53 to the position shown in Fig. 8, after which the carriage 11 is moved along the guide rods 6 into the position shown in Fig. 9. This brings the pattern holder 53, the pattern 65 and the partially cured mold shell 106 on the pattern under the oven 4, where they are left for a predetermined length of time during which time the curing of the mold shell 106 is completed. After the prescribed curing time under the oven 4 the carriage 11 and the parts carried thereby are returned to their original position, and the mold shell 106 is stripped from the pattern.

The mold shell may be stripped upwardly from the pattern while the pattern is in upright position or the pattern may be inverted and the mold shell stripped downwardly therefrom. If it is desired to strip the shell upwardly, the pattern holder and patternware maintained in upright position and the cantilever frame 26 is raised. The raising of the cantilever frame 26 first brings the drain tank 100 into engagement with the ejector plate 67 and then further movement raises the ejector plate and the stripping pins 75 which lift the mold shell from the pattern 65, after which it is removed from the machine. If it is desired to strip the mold shell downwardly from the pattern, the pattern holder is inverted and the hopper 83 is lowered until it engages and forces the ejector plate 67 downwardly which through the stripping pins 75 will strip the shell downwardly from the pattern.

After a mold shell has been stripped from the pattern the carriage 11 with the pattern holder and pattern in upright position are returned to the oven 4, as shown in Fig. 9, for a sufficient time to preheat the pattern to a predetermined temperature. After preheating the carriage is returned to its original position and the pattern holder and pattern inverted. The drain tank 100 is then raised into engagement with the pattern holder around the pattern, as shown in Fig. 5. The parting solution is then sprayed over the face of the pattern from the nozzles 101. After spraying the drain tank 100 is lowered to its original position and the pattern holder and pattern returned to upright position. Everything is now in readiness for the cycle of operation to be repeated in forming the next mold shell.

From the foregoing it will be apparent to those skilled in this art that I have provided a very simple and efficient apparatus for accomplishing the objects of the invention.

It is to be understood that I am not limited to the specific construction shown and described herein as various modifications may be made therein within the spirit of the invention. For example the specfic actuating means, shown as pinions and piston-operated racks, may be replaced by other mechanism adapted to operate in a similar manner. Also the pattern holder may be fixed in location and the oven mounted on a carriage to be shifted over the holder for curing. Other changes and adaptations will be apparent to a person skilled in the art.

What is claimed is:

1. In an apparatus of the character described, a pattern holder adapted to receive a pattern, a hopper for a molding mixture having a discharge opening at its lower end and mounted higher than said holder, closure means for said discharge opening, means operative to cause relative movement between said holder and said hopper to bring said hopper and said holder into engagement with the lower end of the hopper surrounding said pattern, means opening said closure means to supply molding mixture from said hopper to said pattern, means operative to rotate said holder and said hopper in unison to inverted position while maintaining said hopper in contact with said holder for returning excess molding mixture to said hopper, means closing said closure means, means rotating said holder and hopper to upright position, an oven mounted at one side of said pattern holder and means operative to cause relative movement between said holder and said oven to bring said holder into said oven for heating the molding mixture on said pattern.

2. In an apparatus for the character described, a pattern holder adapted to receive a pattern, a hopper for a molding mixture having a discharge opening at its lower end and mounted higher than said holder, closure means for said discharge opening, means operative to cause relative movement between said holder and said hopper to bring said hopper and said holder into engagement with the lower end of the hopper surrounding said pattern, means opening said closure means to supply molding mixture from said hopper to said pattern, means operative to rotate said holder and said hopper in unison to inverted position while maintaining said hopper in contact with said holder for returning excess molding mixture to said hopper, means closing said closure means, means rotating said holder and hopper to upright position, an oven mounted at one side of said pattern holder and means shifting said pattern holder laterally into said oven for heating the molding mixture on said pattern.

3. An apparatus as set forth in claim 1 in which said closure means comprises a set of movable plates positioned to close said discharge opening.

4. An apparatus as set forth in claim 1 in which said closure means comprises a set of louvers positioned to close said discharge opening.

5. In an apparatus as set forth in claim 1, a set of stripping pins carried in said pattern holder, an actuating member for said pins on the back of said holder, and means actuating said member in response to the lowering of said hopper onto said member when said holder is in inverted position.

6. In an apparatus as set forth in claim 1, means applying a parting solution to the underface of said pattern when said pattern holder is in inverted position.

7. In an apparatus of the character described, a rotatably mounted pattern holder adapted to receive a pattern, a hopper for a molding mixture, means including a drain tank for applying a parting solution to said pattern mounted below said pattern holder, means to turn said holder from upright position to inverted position, means to bring said hopper and said holder into engagement, with said hopper extending around said pattern when said holder is in upright position, and means to bring said drain tank and said holder into engagement with said tank sealed around said pattern when said holder is in inverted position.

8. In an apparatus of the character described, a rotatably mounted pattern holder adapted to receive a pattern, a hopper for a molding mixture mounted for vertical movement above said pattern holder, means including a drain tank for applying a parting solution to said pattern mounted for vertical movement below said pattern holder, means to turn said holder from upright position to inverted position, means to bring said hopper and said holder into engagement, with said hopper extending around said pattern when said holder is in upright position, and means to bring said drain tank and said holder into engagement with said tank sealed around said pattern when said holder is in inverted position.

9. In an apparatus for forming a mold shell on a pattern, a rotatably mounted pattern holder adapted to receive said pattern, stripping means carried by said holder and operative when actuated to strip the formed mold shell from said pattern, a hopper for a molding mixture mounted above said holder, means including a drain tank for applying a parting solution to said pattern mounted below said holder, means shifting said holder between upright and inverted positions, means causing relative vertical movement between said holder and said hopper and between said holder and said drain tank, and means responsive to said relative vertical movement to actuate said stripping means.

10. In an apparatus for forming a mold shell on a pattern, a rotatably mounted pattern holder adapted to receive a pattern, ejector pins slidably mounted in said holder and an ejector member on said holder to actuate said pins, a hopper for a molding mixture mounted above said holder for vertical movement into and out of engagement therewith, a drain tank mounted below said holder for vertical movement into and out of engagement therewith, said hopper and said drain tank having rims to seat against said carrier to form an enclosure for said pattern, said ejector member being arranged to be actuated by movement of either said hopper or said tank when said holder is reversed with respect thereto.

11. An apparatus as set forth in claim 10 in which said ejector member comprises a plate positioned to be engaged by said hopper or said tank.

12. In an apparatus of the character described, a pattern carrier adapted to receive a pattern and mounted for rotation about a horizontal axis, a vertically slidable carriage, a hopper for a molding mixture releasably mounted on said carriage and adapted to engage said carrier when said carriage is in lowermost position, a guide track to guide said hopper around said axis for rotation with said carrier, said releasable mounting being arranged to release said hopper from said carriage for rotation around said guide track with said holder.

13. In an apparatus of the character described, a stationary frame, a curing oven spaced from said frame, a carriage mounted for reciprocal movement between said stationary frame and said oven, a pattern holder rotatably mounted on said carriage and adapted to receive a pattern, a carriage mounted for vertical movement on said frame, a hopper for a molding mixture supported by said last carriage above said holder, a frame mounted for vertical movement in said stationary frame, pattern spraying mechanism including a drain tank mounted on said last frame below said holder, means to raise and lower said last carriage to move said hopper into and out of engagement with said holder, means to invert said holder and said hopper in unison while said hopper is maintained in engagement with said holder, means to raise and lower said last frame to move said drain tank into and out of engagement with said holder, and means to reciprocate said first carriage to move said holder into and out of said oven.

14. In an apparatus for forming a mold shell on a pattern, a rotatably mounted pattern holder adapted to receive said pattern, stripping means carried by said holder and operative when actuated to strip the formed mold shell from said pattern, a hopper for a molding mixture mounted above said holder, a set of louvers in said hopper to divide said hopper into upper and lower compartments, means including a drain tank for applying a parting solution to said pattern mounted below said holders, means shifting said holder between upright and inverted positions, means causing relative vertical movement between said holder and said hopper and between said holder and said drain tank, means actuating said louvers for transferring said molding mixture from said hopper to said holder, and means responsive to said relative vertical movement to actuate said stripping means.

15. In an apparatus of the character described, a stationary frame, a curing oven spaced from said frame, a pattern holder rotatably mounted on said frame and adapted to receive a pattern, a carriage mounted for vertical movement on said frame, a hopper for a molding mixture supported by said carriage above said holder, a set of louvers in said hopper to divide said hopper into upper and lower compartments, a frame mounted for vertical movement in said stationary frame, pattern spraying mechanism including a drain tank mounted on said last frame below said holder, means to raise and lower said carriage to move said hopper into and out of engagement with said holder, means actuating said louvers for transferring said molding mixture from said hopper to said holder, means to invert said holder and said hopper in unison while said hopper is maintained in engagement with said holder, means to raise and lower said last frame to move said drain tank into and out of engagement with said holder, and means bringing said holder and said curing oven into cooperative relationship for heating the material in said holder.

16. In an apparatus for forming a mold shell on a pattern, a stationary frame, a curing oven spaced from said frame, a pattern holder rotatably mounted on said frame and adapted to receive a pattern, a carriage mounted for vertical movement on said frame, a hopper for a molding mixture supported by said carriage above said holder, a set of louvers in said hopper to divide said hopper into upper and lower compartments, a frame mounted for vertical movement in said stationary frame, a pattern spraying mechanism including a drain tank mounted on said last frame below said holder, means to raise and lower said carriage to move said hopper into and out of engagement with said holder, means actuating said louvers for transferring said molding mixture from said hopper to said holder, means to invert said holder and said hopper in unison while said hopper is maintained in engagement with said holder, means to raise and lower said last frame to move said drain tank into and out of engagement with said holder, means bringing said holder and said curing oven into cooperative relationship, and ejector means carried by said pattern holder and operative when actuated to strip the formed mold shell from said pattern, said hopper and said drain tank being adapted respectively to actuate said ejector means in response to relative movement thereof with respect to said holder.

EMERY I. VALYI.

References Cited in the file of this patent

UNITED STATES PATENTS

| Number | Name | Date |
|---|---|---|
| 1,384,760 | Hurst | July 19, 1921 |
| 1,994,028 | Rolff | Mar. 12, 1935 |
| 2,449,136 | Pattison | Sept. 14, 1948 |
| 2,542,243 | Gedris | Feb. 20, 1951 |
| 2,617,163 | Jeter et al. | Nov. 11, 1952 |

OTHER REFERENCES

The Iron Age, April 1951, pages 81–85 and 90–98.

The Foundry, August 1950, pages 206–217.

Modern Metals, October 1950, pages 22–24.